March 3, 1942.    J. CRAWFORD ET AL    2,274,668
LOCKING MEANS FOR SERVOMOTORS
Filed Sept. 14, 1939    2 Sheets-Sheet 1

John Crawford
H. W. Johnson
INVENTORS

BY Edwin C. McRae
E. L. Davis
ATTORNEYS.

WITNESS
E. Nitzke

March 3, 1942.  J. CRAWFORD ET AL  2,274,668
LOCKING MEANS FOR SERVOMOTORS
Filed Sept. 14, 1939  2 Sheets-Sheet 2
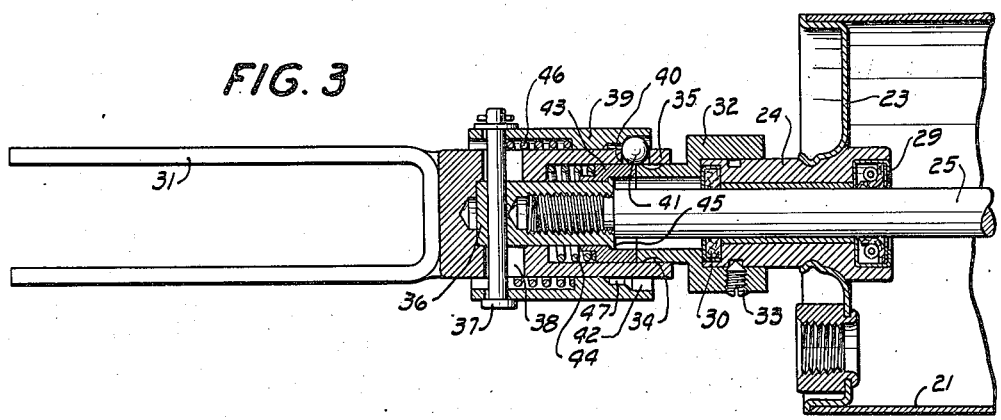
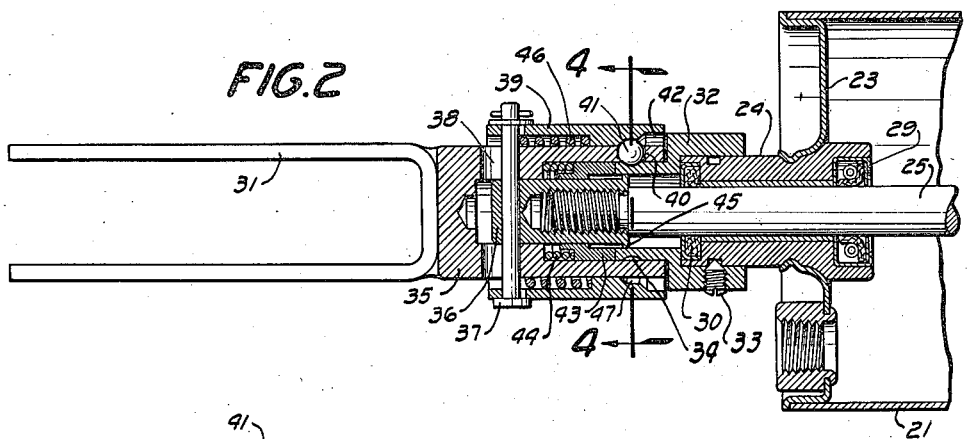
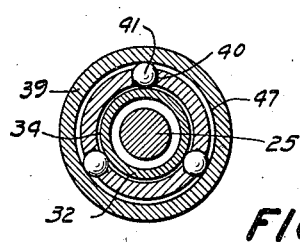
John Crawford
H. W. Johnson
INVENTORS
BY Edwin C. McRae
E. L. Davis
ATTORNEYS.
WITNESS
E. Nitzke Patented Mar. 3, 1942

2,274,668

UNITED STATES PATENT OFFICE 2,274,668

LOCKING MEANS FOR SERVOMOTORS

John Crawford and Harold W. Johnson, Detroit, Mich., assignors to Ford Motor Company, Dearborn, Mich., a corporation of Delaware Application September 14, 1939, Serial No. 294,847

5 Claims. (Cl. 121—40)

The object of our invention is to provide a device for raising and lowering an automobile top, which device will have features not heretofore incorporated in such devices.

Automobile convertible tops are generally formed with a plurality of bows which swing rearwardly so that the top may be raised or lowered, as desired by the operator. Power-operated means comprising a vacuum-operated piston and cylinder assembly has in the past been connected to one of these bows so that the top may be more conveniently raised and lowered. However, a disadvantage of all such power-operated constructions has been that when the top is lowered and the car is driven over a rough road, the inertia of the top causes same to bounce up and down. Straps are sometimes provided for fastening the top in its lowermost position but these, of course, require considerable labor in fastening and unfastening each time it is desired to change the position of the top.

Specifically, our invention comprises a locking device which, when the top is lowered, automatically and positively holds same in its lowered position. The locking mechanism is unique in that only by the initial push or the upward movement of the operating piston may the device be unlocked. Further movement of the piston then raises the top to its open position.

With these and other objects in view, our invention consists in the arrangement, construction and combination of the various parts of our improved device, as described in this specification, claimed in our claims, and illustrated in the accompanying drawings, in which:

Figure 2 is a sectional view, taken upon the line 2—2 of Figure 1, showing our improved locking mechanism in its engaged position.

Figure 3 is a sectional view, similar to that shown in Figure 2, but differing therefrom in that the top raising device is moved upwardly a sufficient distance to unlock the holding mechanism, and Figure 4 is a sectional view, taken upon the line 4—4 of Figure 2.

Figure 1:
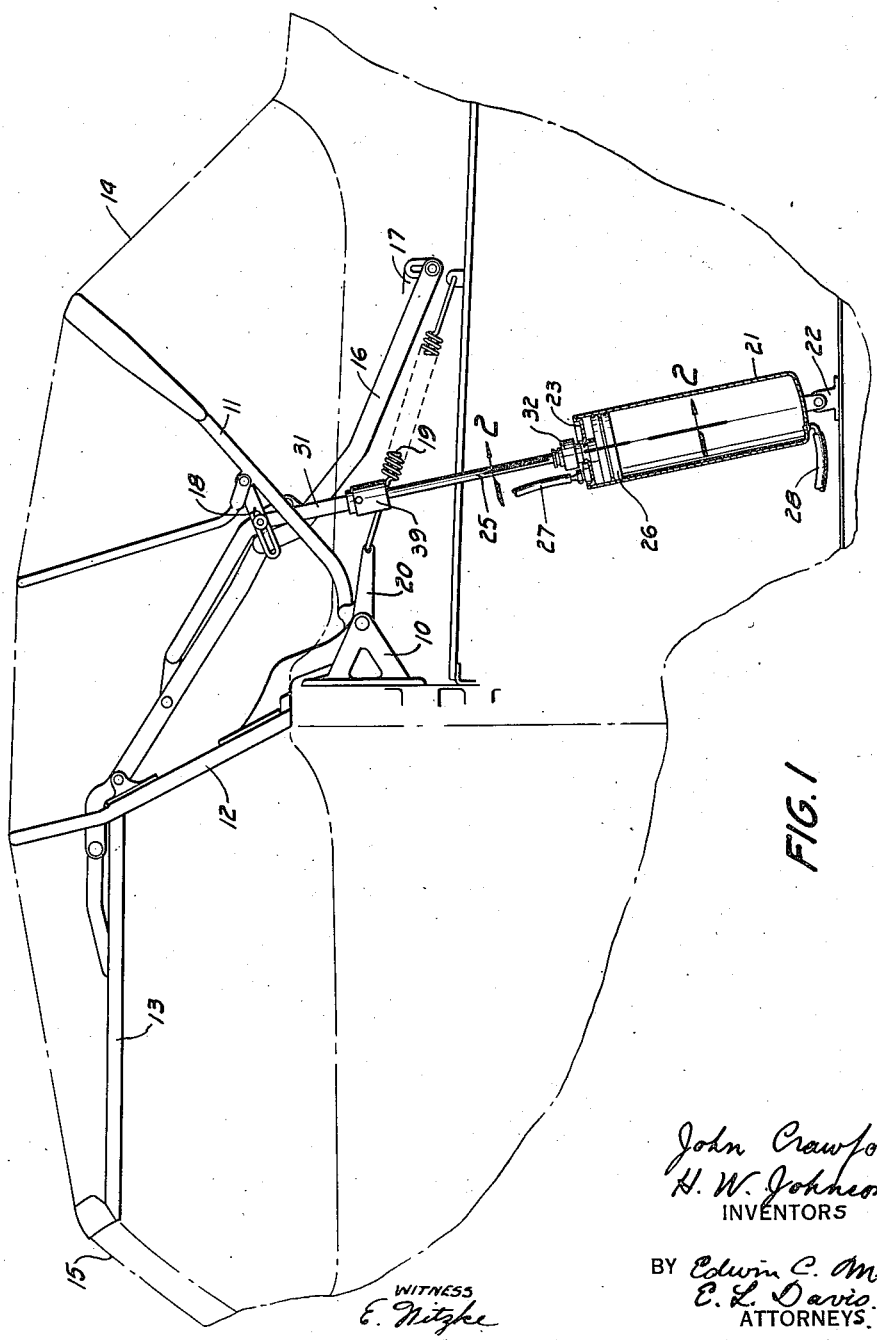
Figure 1 is a vertical sectional view through a motor vehicle top, having our improved operating mechanism associated therewith.

Referring to the accompanying drawings, we have used the reference numeral 10 to indicate one of a pair of brackets which are secured to the rear of the vehicle seat back at the respective ends thereof. The vehicle top is hinged to the brackets 10 but the detailed description of the linkage and bow members which form the top will not be given, as they form no part of this invention and as the invention may be applied to any of the several other forms of collapsible top structures.

The top construction shown herein comprises a rear bow 11, an intermediate bow 12 and a front bow 13. The bows 11 and 12 are hinged to swing around the brackets 10, while the front bow 13 extends forwardly from the upper portion of the intermediate bow 12. Top fabric 14 extends from the rear part of the body over the several bows to position adjacent to the windshield of the car, which is shown by dotted lines 15. A top-operating arm 16 extends from the upper portion of the intermediate bow 12 rearwardly to an anchor bracket 17 which is fastened onto the body of the car, and a link member 18 connects the intermediate portion of the bow 11 with the intermediate portion of the arm 16.

The various links, arms and bows are so arranged that when the link 18 is raised, the various bows will swing to their extended positions. When the link 18 is lowered, then the various bows fold up and the top lowers. A counter-balancing tension spring 19 extends from a fixed point in the body to an arm 20, which arm forms a continuation of the intermediate bow 12. When the top is lowered, the spring 19 is tensioned so that when the top is being raised the energy stored in spring 19 assists the raising movement to make raising and lowering of the top relatively easy.

The parts so far described comprise a conventional convertible top structure, and no claim is made herein to the top structure, per se.

In order to raise and lower the top, we have provided a pair of cylinders 21 (only one shown), each having a closed end which is pivotally connected to a bracket 22. These brackets are secured to the floor of the car just rearwardly of the front seat on the respective sides of the car. As both of these cylinders are identical and are connected to the top in the same manner, only one of the cylinders will be described in detail.

The upper end of each cylinder 21 is provided with a cylinder head 23, which head is provided with a sleeve 24 fixed therein through which a piston rod 25 is reciprocally mounted. A piston 26 is secured to the lower end of the rod 25 and suitable hose connections 27 and 28 are provided in the head 23 and bottom of the cylinder 21, respectively. The connections 27 and 28 are connected with a two-way valve, not shown in the drawings, which valve is disposed on the instrument panel of the car and which valve is connected to the intake manifold of the engine associated with the vehicle. The vacuum present in the engine manifold may therefore be selectively connected to either of the connections 27 or 28. When the upper end of the cylinder is supplied with vacuum, the piston 26 is pulled upwardly; and when vacuum is supplied to the lower end of the cylinder, the piston will be moved downwardly. A leather sealing ring 29 is secured in the rear end of the sleeve 24 and closely fits the piston rod 25 so as to prevent leakage of air into the cylinder. A felt oiling ring 30 is secured in the outer end of the sleeve 24, which ring lubricates the piston rod 25 as it reciprocates in and out of the cylinder.

We have provided a forked coupling member 31, the lower end of which is secured through mechanism, about to be described, to the rod 25, while the forked upper end straddles the arm 16 and link 18. The forked end of the coupling is pivotally connected to the link 18 so that when the piston rod 25 is raised the link 18 is likewise raised, to thereby raise the top to its open position.

An annular collar 32 is fixedly secured to the outer end of the sleeve 24 by means of a set screw 33, the upper end of which collar is provided with an annular spherical groove 34 therein. The lowermost end of the coupling member 31 is formed as a sleeve 35, which sleeve is adapted to slip over the upper end of the collar 32. A piston rod adapter 36 is reciprocally mounted in the bore of the sleeve 35, and is fastened therein for limited reciprocation by means of a pin 37. The upper end of the piston rod 25 is threaded into a threaded bore in the adapter 36 to thereby secure the adapter positively to the piston rod. Hereafter, the piston rod and adapter may be considered as a single unit.

It will be noted that the pin 37 is fitted closely into the adapter 36 and that elongated slots 38 are provided where the pin extends through the sleeve 35. Thus, the piston rod may be raised an eighth of an inch or so, relative to the sleeve 35, without raising same. This initial movement of the piston rod functions to unlock the device. To accomplish this, a ring member 39 is reciprocally mounted upon the outside of the sleeve 35, which ring extends over the full length of the sleeve. The pin 37 extends through suitable openings in this ring so that when the piston rod 25 is initially moved upwardly the ring 39 will be likewise moved upwardly, relative to the sleeve 35.

It will be noted from Figure 4 that the inner end of the sleeve 35 is provided with three drilled openings 40 therethrough in substantial alignment with the groove 34 when the members are in their lowermost positions. A steel ball 41 is inserted into each of the openings 40. The lower end of the ring 39 is provided with a stepped bore therein, the outer step 42 of which is considerably larger in diameter than the portion 47 which is in alignment with the balls 41.

The device when in the position shown in Figure 2 is locked. In this position the balls 41 are held inwardly in the groove 34 and consequently an upward force upon the sleeve 35 cannot pull the sleeve away from the collar 32. The device can only be unlocked by permitting the balls 41 to move outwardly from the groove 34.

When it is desired to raise the top, vacuum is conducted to the upper end of the cylinder which draws the piston rod 25 upwardly, thereby moving the ring 39 upwardly, relative to the stationary sleeve 35. As soon as the ring 39 has moved upwardly the distance permitted by the slots 38, the balls 41 are free to move outwardly into the enlarged portion 42. This permits the sleeve 35 to be raised upwardly, relative to the collar 32. This action is smooth, the piston rod first unlocking the sleeve and then picking up the same as it is raised in the cylinder.

In order that the balls 41 may not drop out of the openings 40 when the device is in its raised position, we have provided a sleeve 43 which is reciprocally mounted within the sleeve 35 upon the lower portion of the adapter 36. A compression spring 44 resiliently urges the sleeve 43 downwardly at all times. The lower end of the adapter 36 is provided with a shoulder 45 which co-acts with the sleeve 43 at its lowermost position to prevent the sleeve from slipping off the adapter. The purpose of the sleeve 43 is to retain the balls 41 in the openings 40 when the device is in its raised position. It will be noted from Figure 3 that as soon as piston rod 25 is raised to the position where the balls move outwardly into the enlarged portion 42, the sleeve 43 has been urged downwardly so that its lower end is in alignment with the balls. The balls therefore cannot move inwardly out of the openings 40 and, of course, cannot move outwardly due to the ring 39.

A second compression spring 46 is interposed between the pin 37 and a shoulder formed on the inside of the ring 39, the purpose of which is to prevent rattling of the parts. A slight clearance is provided between the pin 37 and the ring 39 to allow for manufacturing variations and if no spring were provided, the parts would have a tendency to rattle when in the raised position. The spring 46 urges the ring downwardly against the balls so as to force them inwardly aganist the sleeve 43 and thereby prevent rattling of the parts.

Among the many advantages arising from the use of our improved construction, it may be well to mention that the device is entirely automatic in operation. When the top is lowered, the device automatically locks the coupling member 31 to the collar 32 so that any force applied to raise the top will be ineffectual. When the piston 25 is raised, the lock is automatically released.

Some changes may be made in the arrangement, construction and combination of the various parts of our improved device without departing from the spirit of our invention, and it is our intention to cover by our claims such changes as may reasonably be included within the scope thereof.

We claim as our invention:

1. A device for raising and lowering an automobile top comprising, a cylinder pivotally mounted in said automobile, said cylinder having a piston reciprocally mounted therein, a cylinder head on said cylinder, a rod associated with said piston which extends upwardly through said cylinder head, a collar fixed to said cylinder head, a coupling member having one end pivotally connected to the top to be raised and having its other end reciprocally mounted upon the upper end of said piston rod for limited reciprocation relative thereto, a ring reciprocally mounted upon said coupling member, said ring being connected to said piston rod for movement therewith, and locking means extending through a suitable opening in said coupling member, said ring in its lowermost position forcing said locking means inwardly against said collar to lock said coupling member thereto, and said ring in its other positions permitting said locking means to move outwardly relative to said collar to thereby release said coupling member from said collar.

2. A device for raising and lowering an automobile top comprising, a cylinder pivotally mounted in said automobile, said cylinder having a piston reciprocally mounted therein, a cylinder head on said cylinder, a rod extending from said piston upwardly through said cylinder head, a coupling member reciprocally mounted upon the outer end of said piston rod, the reciprocating movement of said coupling relative to said rod being limited by a pin and slot connection, a ring reciprocally mounted upon the periphery of said sleeve, said pin extending through openings in said ring whereby movement of the piston rod relative to said coupling member will move said ring correspondingly, a stationary collar fixed upon said cylinder head, said collar having an annular groove therein, and said coupling member having a plurality of openings therethrough which in its retracted position are in substantial alignment with said groove, ball members mounted in each of said openings, said ring member when in its lowermost position co-acting with said ball members to force same inwardly into said groove and thereby lock said coupling member to said stationary member, and said ring being enlarged toward its lowermost end so that when said ring is moved outwardly relative to said coupling member, said ball members may move radially into said enlarged bore to thereby release the coupling from said collar.

3. A device for raising and lowering an automobile top comprising, a cylinder mounted in said automobile in a vertical position, the lower end of which is pivotally secured to said automobile, a piston reciprocally mounted in said cylinder, a cylinder head fixed over the upper end of said cylinder, said piston having a piston rod extending upwardly therefrom through said cylinder head, a coupling sleeve reciprocally mounted upon the upper end of said piston rod, said sleeve having longitudinally extending slots therein through which a pin extends, said pin being fixed in the outer end of said piston rod whereby a longitudinal movement of said sleeve relative to said piston rod is permitted, a ring reciprocally mounted upon the periphery of said sleeve, said pin extending through suitable openings in said sleeve whereby reciprocating movement of the piston rod relative to said sleeve will move said ring correspondingly, a collar fixed to said piston head, said collar having an annular groove therein, and said sleeve having a plurality of radially extending openings therein in substantial alignment with said groove when the coupling is in its lowermost position, ball members disposed in each of said openings, which when said ring is in its lowermost position are forced inwardly through said openings into said groove to thereby prevent said sleeve from moving outwardly relative to said collar, said ring having an enlarged bore therein adjacent to said ball members which, when said ring is moved upwardly relative to said sleeve, permits said ball members to move outwardly from said groove thereby releasing the sleeve from said collar, and a second sleeve reciprocally mounted within said coupling sleeve which is resiliently urged to position where it prevents inward movement of said ball members to thereby retain said ball members in said coupling sleeve after the sleeve has been released from said collar.

4. A device for raising and lowering an automobile top comprising, a cylinder fixed in said automobile, said cylinder having a piston reciprocally mounted there, a cylinder head on said cylinder, a piston rod connected to said piston which extends outwardly through said cylinder head, a two part coupling member having one part pivotally connected to the top to be raised and having its other part fixed to the upper end of said piston rod, said parts being permitted limited reciprocation relative to each other, a holding member fixed to said cylinder head, a ring member forming a part of the coupling element which is fixed to said piston rod, and locking means extending through a suitable opening in said top part of the coupling member, said ring member in its innermost position forcing said locking means inwardly against said holding member to lock said coupling thereto, and said ring member in its outermost position permitting said locking means to move outwardly relative to said holding member to thereby release said coupling.

5. A device for raising and lowering an automobile top comprising, a piston and cylinder assembly, the cylinder member of which is pivotally fixed in said automobile, and the piston member of which is arranged to move upwardly relative thereto, a head on said cylinder, a rod associated with said piston which extends upwardly through said cylinder head, a two part coupling member having one part pivotally connected to the top to be raised and having its other part reciprocally mounted relative thereto, said other part being fixed upon the upper end of said piston rod, a ring member associated with said other part of said coupling member, and a plurality of ball members extending through suitable openings in said top part of the coupling member, said ring member in its lowermost position forcing said ball members inwardly in a groove in said cylinder head to thereby lock said coupling to said head, said ring in its other position permitting said ball members to move outwardly relative to said groove to thereby release said coupling from said head.

JOHN CRAWFORD.
HAROLD W. JOHNSON.